United States Patent [19]
Kaiser et al.

[11] Patent Number: 5,898,896
[45] Date of Patent: Apr. 27, 1999

[54] METHOD AND APPARATUS FOR DATA ORDERING OF I/O TRANSFERS IN BI-MODAL ENDIAN POWERPC SYSTEMS

[75] Inventors: John Michael Kaiser; Warren Edward Maule, both of Cedar Park; Robert Dominick Mirabella; David Wayne Victor, both of Round Rock, all of Tex.

[73] Assignee: International Business Machines Corporation, Armonk, N.Y.

[21] Appl. No.: 08/826,853

[22] Filed: Apr. 10, 1997

[51] Int. Cl.⁶ ........................................... G06F 13/38
[52] U.S. Cl. ..................... 395/885; 395/309; 395/306
[58] Field of Search ..................... 395/286, 307–312, 395/280, 133, 806, 300, 88, 885–887

[56] References Cited

U.S. PATENT DOCUMENTS

| | | | |
|---|---|---|---|
| 5,168,561 | 12/1992 | Vo | 395/425 |
| 5,265,237 | 11/1993 | Tobias et al. | 395/500 |
| 5,398,328 | 3/1995 | Weber et al. | 395/500 |
| 5,423,010 | 6/1995 | Mizukami | 395/375 |
| 5,519,842 | 5/1996 | Atallah et al. | 395/412 |
| 5,550,987 | 8/1996 | Tanaka | 395/286 |
| 5,572,713 | 11/1996 | Weber et al. | 395/500 |
| 5,574,923 | 11/1996 | Heeb et al. | 395/800 |
| 5,627,975 | 5/1997 | Bryant et al. | 395/307 |
| 5,630,084 | 5/1997 | Ikumi | 395/376 |
| 5,634,013 | 5/1997 | Childers et al. | 395/280 |
| 5,640,545 | 6/1997 | Baden et al. | 395/515 |
| 5,655,065 | 8/1997 | Robertson et al. | 395/133 |
| 5,687,337 | 11/1997 | Carnevale et al. | 395/380 |
| 5,721,957 | 2/1998 | Huang et al. | 395/886 |

FOREIGN PATENT DOCUMENTS 0 695 998 A2  2/1996  European Pat. Off. .

OTHER PUBLICATIONS

"Hardware Assist for Data Format Conversion", IBM Technical Disclosure Bulletin, vol. 33, No. 7, Dec. 1990, pp.190–193.

"Chapter 23: Big vs. Little–Endian", PowerPC System Architecture, pp. 277–308.

*Primary Examiner*—Christopher B. Shin
*Attorney, Agent, or Firm*—Kelly K. Kordzik; Winstead Sechrest & Minick P.C.

[57] ABSTRACT

To present a consistent image of storage facilities to components in Bi-modal Endian PowerPC system enviromnents, provision is made for transferring data between system components in the appropriate Endian format. Endian conversion function can be incorporated into the memory controller subsystem by adding byte-lane swapping logic on the inbound and outbound I/O data paths. With this structure, inbound data from the processor and memory bus will be converted to true Little Endian order before being sent to I/O devices. Likewise, true Little Endian data from I/O devices targeted for the processor or memory is modified to reflect the PowerPC Little Endian byte ordering convention.

5 Claims, 4 Drawing Sheets

STORAGE DOUBLEWORD

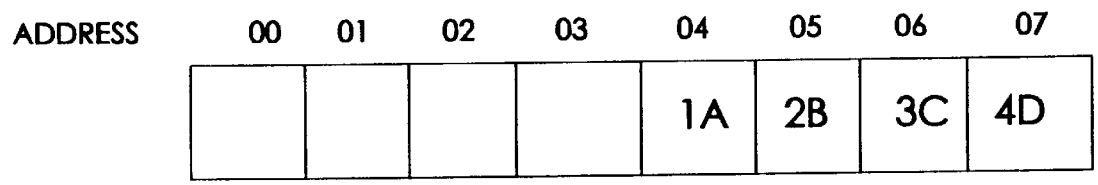
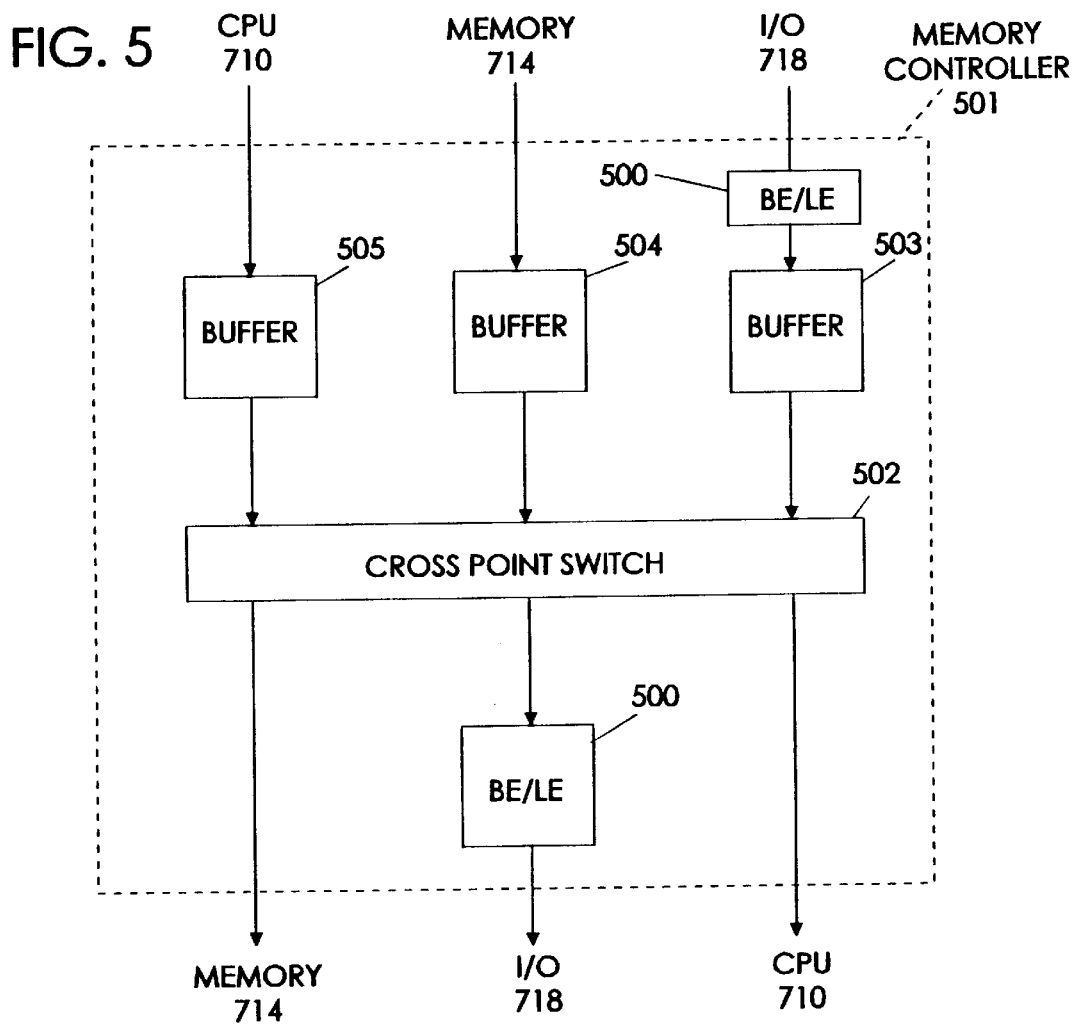

METHOD AND APPARATUS FOR DATA ORDERING OF I/O TRANSFERS IN BI-MODAL ENDIAN POWERPC SYSTEMS

TECHNICAL FIELD

The present invention relates in general to data processing systems, and in particular, to supporting data communications between input/output devices and a processor.

BACKGROUND INFORMATION

In most computer systems today, the smallest addressable unit of storage is an 8-bit byte. Data is typically transferred between the various components of a computer system in groups of bytes, such as words, doublewords and quadwords to meet bandwidth needs. If the data is to be used or evaluated correctly, it is necessary to know the correlation of the byte addresses to the value of the data, i.e., the most significant byte ("MSB").

Processor architectures that order data such that the lowest byte address corresponds to the highest order byte (leftmost) are called Big Endian. Architectures that assign the lowest byte address to the lowest order (rightmost) byte are referred to as Little Endian. Some processor architectures, such as the PowerPC processor manufactured by IBM corporation support both byte ordering schemes.

To illustrate the difference, consider the format of the word of data shown in FIG. 1 Data structure "n" consists of 4 bytes of data represented as hexidecimal characters 1A, 2B, 3C, 4D. When a processor, in Big Endian mode, stores the word in memory, the resulting storage map appears as shown in FIG. 2. If the processor was set up in Little Endian mode, the storage mapping would look as shown in FIG. 3.

When configured to operate in Little Endian mode, processors based on the PowerPC architecture present a slightly different storage map to the true Little Endian map as shown in FIG. 3. When presenting 1, 2 or 4-byte data transfers to the memory subsystem, PowerPC processors such as the 601, 604 and 620 chips will modify the lower 3 bits of the effective storage address creating the "pseudo-Little Endian" storage map as shown in FIG. 4. The address translation results in reversing the byte ordering within doublewords from the true Little Endian mapping. This creates a problem for input/output (I/O) devices that need access to architected storage areas. Therefore, there is a need in the art to permit I/O devices, which require a true Little Endian image of these storage facilities to be able to operate with PowerPC processors.

SUMMARY OF THE INVENTION

The foregoing need is addressed by the present invention, which provides circuitry for reordering data structures so that input/output devices, which require a true Little Endian data structure order, can efficiently communicate with a PowerPC processor and its particular manner for ordering data structures. More particularly, the present invention provides for byte ordering multiplexers implemented between the input/output devices and the remainder of the PowerPC system architecture.

In one embodiment, the present invention includes a data processing system that comprises a PowerPC processor utilizing PowerPC Little Endian byte ordering, and an I/O device utilizing true Little Endian byte ordering, and a memory controller operable for communicating data between the PowerPC processor and the I/O device, wherein the memory controller includes circuitry operable for converting data so that it can be transferred between the I/O device and the PowerPC processor despite the differences between their respective Little Endian byte ordering. The PowerPC Little Endian byte ordering within a doubleword is reversed with respect to the true Little Endian byte ordering. In true little Endian byte ordering, bytes 0:3 are associated with addresses 3:0 of the doubleword respectively. Within PowerPC Little Endian byte ordering, bytes 0:3 are associated with addresses 4:7 of the doubleword.

The present invention can be configured to operate to convert data in the manner set forth above between any two data processing system devices, wherein the first device is configured to operate with a Little Endian byte ordering that is the reverse of the Little Endian byte ordering of the second device.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 illustrates a Little Endian storage map within a PowerPC architecture;

FIG. 5 illustrates an implementation of the present invention;

DETAILED DESCRIPTION

Figure 1:
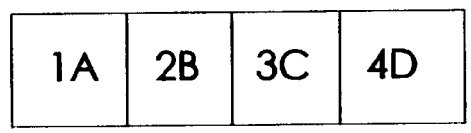
FIG. 1 illustrates the format of a word of data.
Figure 2:
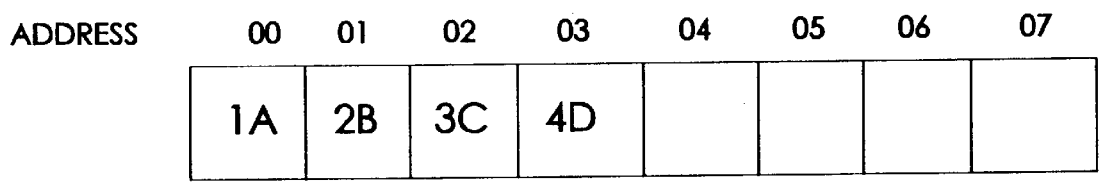
FIG. 2 illustrates a Big Endian storage map.
Figure 3:
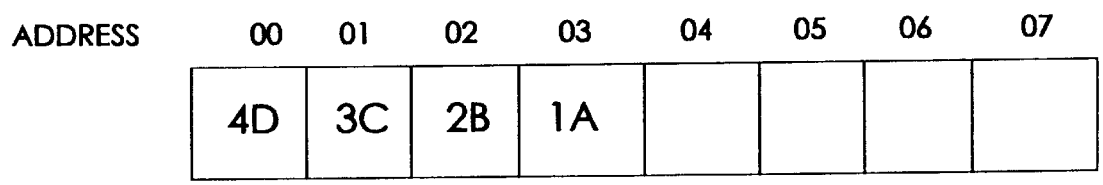
FIG. 3 illustrates a Little Endian storage map.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 7:
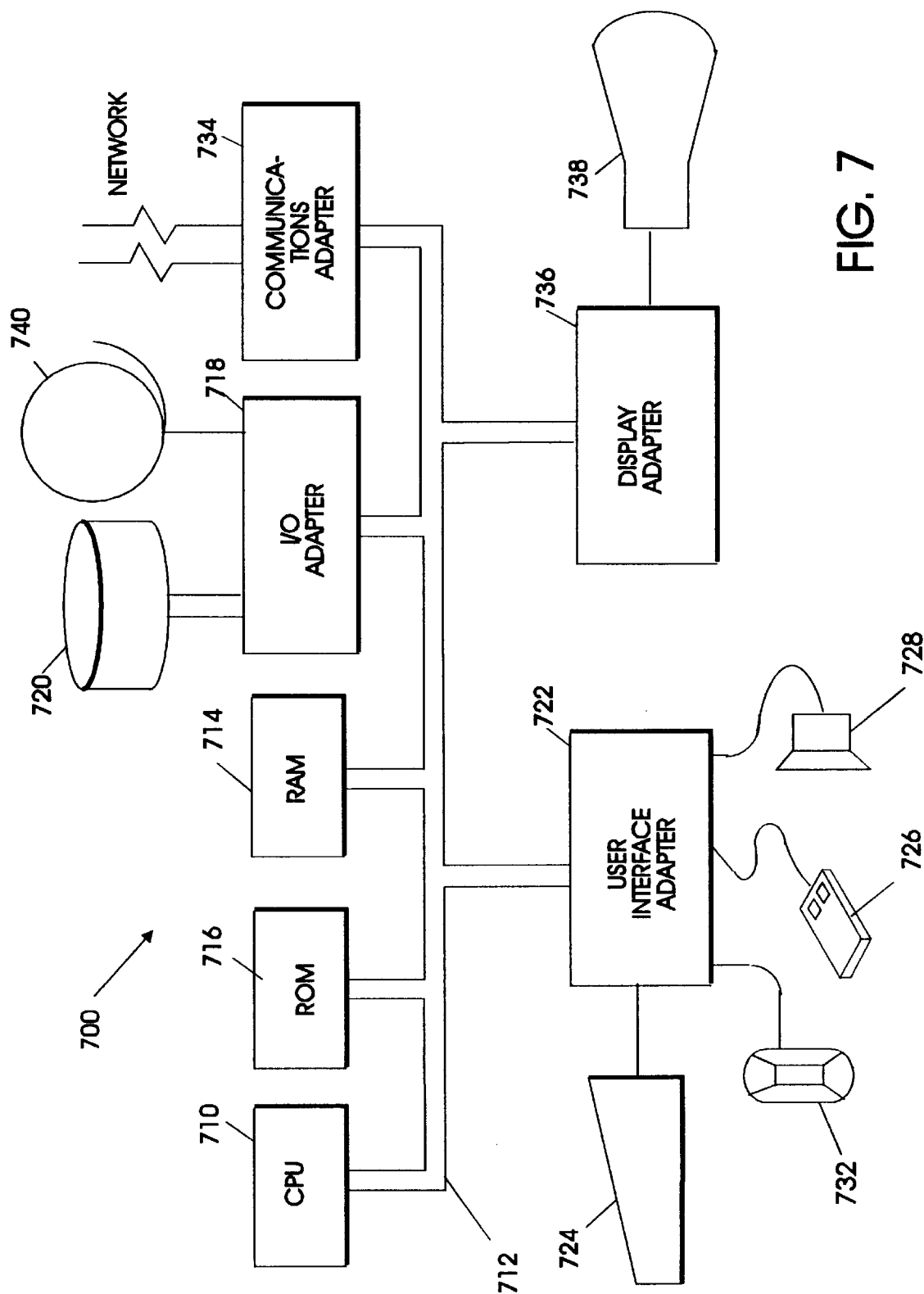
FIG. 7 illustrates a data processing system configured in accordance with the present invention.

A representative hardware environment for practicing the present invention is depicted in FIG. 7, which illustrates a typical hardware configuration of workstation 700 in accordance with the subject invention having central processing unit (CPU) 710, such as a conventional microprocessor, and a number of other units interconnected via system bus 712. Workstation 700 includes random access memory (RAM)

714, read only memory (ROM) 716, and input/output (I/O) adapter 718 for connecting peripheral devices such as disk units 720 and tape drives 740 to bus 712, user interface adapter 722 for connecting keyboard 724, mouse 726, speaker 728, microphone 732, and/or other user interface devices such as a touch screen device (not shown) to bus 712, communication adapter 734 for connecting workstation 700 to a data processing network, and display adapter 736 for connecting bus 712 to display device 738. CPU 710 may include other circuitry not shown herein, which will include circuitry commonly found within a microprocessor, e.g., execution unit, bus interface unit, arithmetic logic unit, etc. CPU 710 may also reside on a single integrated circuit.

In one embodiment of the present invention, CPU 710 is a PowerPC processor manufactured by IBM Corporation.

Referring to FIG. 5, the invention describes a method to support true Little-Endian data transfers between I/O devices 718 and PowerPC architected processor chips 710 and memory 714 in Little Endian systems. Please refer to Chapter 23: *Big vs. Little Endian in PowerPC System Architecture,* copyright 1995 by MindShare, Inc., pp. 277–308, which is hereby incorporated by reference herein. In the example herein, I/O device 718 refers to I/O adapter 718 in FIG. 7; however, any device operating in a true Little Endian mode may take advantage of the features of the present invention. Byte reordering stations 500 are incorporated into the data paths between the I/O and processor ports of the memory controller subsystem 501. Byte reordering will occur on data transfers originating from devices on the CPU bus 712 targeted for I/O devices 718, for data transfers from I/O devices 718 targeted for the memory controller 501, and for memory accesses from I/O devices 718.

Figure 6:
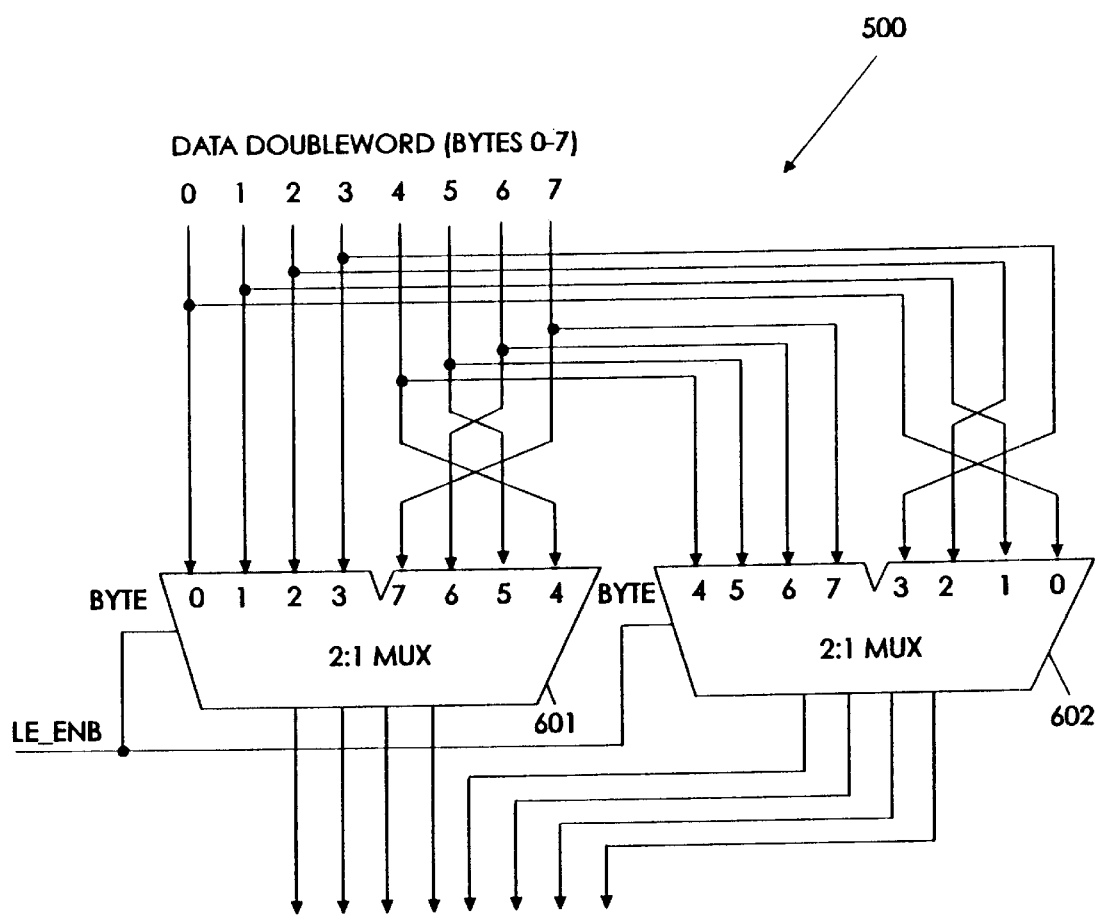
FIG. 6 illustrates byte ordering multiplexers in accordance with the present invention.

FIG. 6 illustrates how the byte reordering task is accomplished. Each BE/LE station 500 consists of two 32-bit 2:1 multiplexors 601, 602, which are data doubleword wired. Data is presented to the leftmost 4-byte input [0:3] of each mux 601, 602 in the order it was received from the external buses. The rightmost 4-byte data input [4:7] is wired to the mux 601, 602 in reversed order. When the system is operating in Big Endian mode, the multiplexor select signal LE_ENB is disabled ("0"), the leftmost 4 bytes of each multiplexor 601, 602 (bytes [0:3] of mux 601 and bytes [4:7] of mux 602) are gated to the output and no reordering of bytes takes place. The significance of each byte remains unchanged.

In Little Endian mode, the LE_ENB select is enabled ("1"). The rightmost data mux inputs (bytes [4:7] of mux 601 and bytes [0:3] of mux 602) are gated to the output. The resulting data doubleword will have byte 0 swapped with byte 7, 1 with 6, 2 with 5, and 3 with 4 from the order it was received from the external bus. The data doubleword now reflects a true Little Endian storage image with byte 7 as the MSB and byte 0 as the LSB. Similar mux structures (not shown) are used to adjust the parity associated with each byte in the doubleword. The multiplexor select (LE_ENB) is sourced from a flipflop (not shown) that is either set or reset via software prior to run-time.

The table below further illustrates the above-described operation of multiplexor 601 and 602:

| LE_ENB | MUX DATA-OUT BYTE ORDER |
|---|---|
| "0" | 0 1 2 3 4 5 6 7 (Big Endian) |
| "1" | 7 6 5 4 3 2 1 0 (Little Endian) |

Although the present invention and its advantages have been described in detail, it should be understood that various changes, substitutions and alterations can be made herein without departing from the spirit and scope of the invention as defined by the appended claims.

What is claimed is:

1. A data processing system comprising:
   a PowerPC processor utilizing PowerPC Little Endian byte ordering;
   an I/O device utilizing true Little Endian byte ordering; and
   a memory controller operable for communicating data between said PowerPC processor and said I/O device, wherein said memory controller further comprises:
      circuitry operable for converting data to be transferred from said I/O device to said PowerPC processor or memory from said true Little Endian byte ordering to said PowerPC Little Endian byte ordering; and
      circuitry operable for converting data to be transferred from said PowerPC processor or memory to said I/O device from said PowerPC Little Endian byte ordering to said true Little Endian byte ordering.

2. The system as recited in claim 1, wherein said PowerPC Little Endian byte ordering within a doubleword is reversed with respect to true Little Endian byte ordering.

3. The system as recited in claim 2, wherein in said true Little Endian byte ordering bytes 0:1 are associated with addresses 1:0 of said doubleword, respectively, and wherein in said PowerPC Little Endian byte ordering bytes 0:1 are associated with addresses 6:7 of said doubleword, respectively.

4. The system as recited in claim 1, wherein said converting circuitry each further comprises:
   first and second 2:1 multiplexers, wherein a leftmost 4 byte input of each multiplexer receives said data in a same order as presented on a bus coupling said memory controller to either said processor or said I/O device, and wherein a rightmost 4 byte input of each multiplexer receives said data in a reverse order as presented on said bus coupling said memory controller to either said processor or said I/O device.

5. The system as recited in claim 1, wherein said memory controller may be configured to operate in Big Endian mode.

* * * * *